United States Patent
Takacs et al.

(10) Patent No.: US 11,425,805 B2
(45) Date of Patent: Aug. 23, 2022

(54) CONTROL CIRCUIT FOR TUBULAR LIGHT EMITTING DIODE

(71) Applicant: ENERGY FOCUS, INC., Solon, OH (US)

(72) Inventors: Laszlo A. Takacs, San Mateo, CA (US); Attila Tomasovics, San Jose, CA (US); Matthew Downie, Solon, OH (US); John McGreevey, Solon, OH (US)

(73) Assignee: ENERGY FOCUS, INC., Solon, OH (US)

(*) Notice: Subject to any disclaimer, the term of this patent is extended or adjusted under 35 U.S.C. 154(b) by 0 days.

(21) Appl. No.: 17/167,458

(22) Filed: Feb. 4, 2021

(65) Prior Publication Data
US 2021/0243862 A1   Aug. 5, 2021

Related U.S. Application Data

(60) Provisional application No. 62/970,558, filed on Feb. 5, 2020.

(51) Int. Cl.
| | |
|---|---|
| *H05B 45/31* | (2020.01) |
| *H05B 45/32* | (2020.01) |
| *H05B 45/50* | (2022.01) |
| *F21Y 115/10* | (2016.01) |
| *F21V 23/00* | (2015.01) |
| *F21Y 103/00* | (2016.01) |

(52) U.S. Cl.
CPC .......... *H05B 45/31* (2020.01); *H05B 45/32* (2020.01); *H05B 45/50* (2020.01); *F21V 23/003* (2013.01); *F21Y 2103/00* (2013.01); *F21Y 2115/10* (2016.08)

(58) Field of Classification Search
None
See application file for complete search history.

(56) References Cited

U.S. PATENT DOCUMENTS

2012/0133298 A1   5/2012   Campbell

FOREIGN PATENT DOCUMENTS

| WO | 2013/110024 A1 | 7/2013 | |
| WO | WO-2013110024 A1 * | 7/2013 | ............. H05B 47/10 |
| WO | 2017/024185 A1 | 2/2017 | |
| WO | WO-2017024185 A1 * | 2/2017 | .......... F21V 23/0471 |
| WO | 2018/192470 A1 | 10/2018 | |

OTHER PUBLICATIONS

International Search Report and Written Opinion, PCT/US2021/016561, dated May 26, 2021, 22 pages.

* cited by examiner

*Primary Examiner* — Dedei K Hammond
(74) *Attorney, Agent, or Firm* — Rankin, Hill & Clark LLP (57) ABSTRACT

According to one aspect, a control circuit for a tubular light emitting diode (TLED) lamp may include an input detection circuit that detects, from an input signal, a type of control desired based on a characteristic of the input signal and generate an output signal, a digital control circuit that controls operation according to a digital lighting protocol, and an analog control circuit that controls operation according to a voltage associated with the input signal. The digital control circuit may be enabled or disabled based on the output signal. The analog control circuit may be enabled or disabled based on the output signal.

20 Claims, 9 Drawing Sheets

CONTROL CIRCUIT FOR TUBULAR LIGHT EMITTING DIODE

BACKGROUND

Generally, using an 'unwired' end of a tubular light emitting diode (TLED) lamp for control worked only for zero volt to ten volt dimming. That is, conventional 'wired control' input approaches have fallen short for 'smart tube' retrofits with respect to simplicity, cost, performance, and controllability options.

Power-line communications systems generally operate by adding a modulated carrier signal to the wiring system. Different types of power-line communications use different frequency bands. Since the power distribution system was originally intended for transmission of AC power at typical frequencies of 50 Hz or 60 Hz, power wire circuits have only a limited ability to carry higher frequencies. Thus, the propagation problem is a limiting factor for each type of power-line communications.

BRIEF DESCRIPTION

According to one aspect, a control circuit for a tubular light emitting diode (TLED) lamp may include an input detection circuit configured to detect, from an input signal, a type of control desired based on a characteristic of the input signal and generate an output signal, a digital control circuit configured to control operation according to a digital lighting protocol, and an analog control circuit configured to control operation according to a voltage associated with the input signal. The digital control circuit may be enabled or disabled based on the output signal. The analog control circuit may be enabled or disabled based on the output signal.

The control circuit may include a microcontroller configured to receive the output signal from the input detection circuit. The input detection circuit may detect triac control as the type of control desired based on a triac component from the input signal including a delay. The input detection circuit may detect digital control as the type of control desired based on a digital component from the input signal including a square waveform. The input detection circuit may detect analog control as the type of control desired based on an analog component from the input signal. The control circuit may include a voltage protection circuit configured to pass the input signal to the input detection circuit. The voltage protection circuit may include an AC to DC converter.

The input detection circuit may include a light emitting diode (LED) having an anode end and a cathode end, a first switch, and a second switch. The cathode end of the diode may be connected to the first switch, the anode end of the diode may be connected to an input signal line from a voltage protection circuit, and the first switch may switch between a voltage-out of a voltage divider and an end of the voltage divider connected to the voltage protection circuit. The digital control circuit may include a switch and a light emitting diode (LED) having an anode end and a cathode end. The switch may be connected to the input signal through the input detection circuit and the output signal to a voltage protection circuit. The analog control circuit may include a transformer having a first set of windings and a second set of windings. The first set of windings may be connected to an analog enable signal line from a microcontroller. A first end of the second set of windings may be connected to an input signal line providing the input signal. A second end of the second set of windings may be connected to a switch which may be connected to a line out signal line for the control circuit.

According to one aspect, a control circuit for a tubular light emitting diode (TLED) lamp may include an input detection circuit configured to detect, from an input signal, a type of control desired based on a characteristic of the input signal and generate an output signal, a digital control circuit configured to control operation according to a digital lighting protocol, an analog control circuit configured to control operation according to a voltage associated with the input signal, and a voltage protection circuit configured to pass the input signal to the input detection circuit. The digital control circuit may be enabled or disabled based on the output signal. The analog control circuit may be enabled or disabled based on the output signal.

The control circuit may include a microcontroller configured to receive the output signal from the input detection circuit. The input detection circuit may detect triac control as the type of control desired based on a triac component from the input signal including a delay. The input detection circuit may detect digital control as the type of control desired based on a digital component from the input signal including a square waveform. The input detection circuit may detect analog control as the type of control desired based on an analog component from the input signal. The voltage protection circuit may include an AC to DC converter.

According to one aspect, a control circuit for a tubular light emitting diode (TLED) lamp may include an input detection circuit configured to detect, from an input signal, a type of control desired based on a characteristic of the input signal and generate an output signal, a digital control circuit configured to control operation according to a digital lighting protocol, an analog control circuit configured to control operation according to a voltage associated with the input signal, and a microcontroller configured to receive the output signal from the input detection circuit. The digital control circuit may be enabled or disabled based on the output signal. The analog control circuit may be enabled or disabled based on the output signal.

The input detection circuit may detect triac control as the type of control desired based on a triac component from the input signal including a delay. The input detection circuit may detect digital control as the type of control desired based on a digital component from the input signal including a square waveform. The input detection circuit may detect analog control as the type of control desired based on an analog component from the input signal.

DETAILED DESCRIPTION

Figure 1:
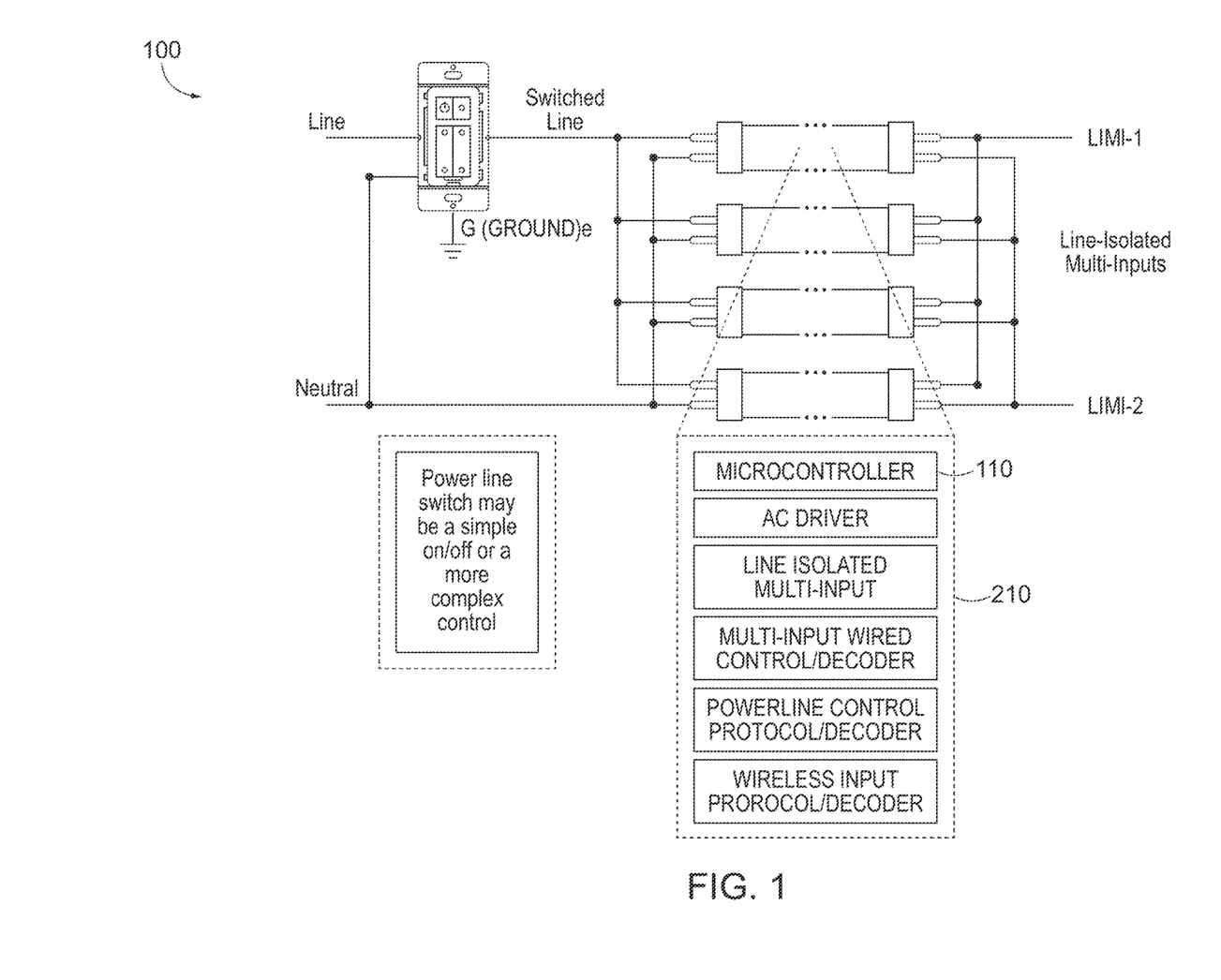
FIG. 1 is an exemplary diagram of a control circuit for a tubular light emitting diode (TLED) lamp, according to one aspect.

FIG. 1 is an exemplary diagram 100 of a microcontroller 110 driven control circuit 210 for a tubular light emitting diode (TLED) lamp, according to one aspect. As seen in FIG. 1, the TLED includes the control circuit 210, which is added to a building's wiring including a wall switch, a line connection to the wall switch, a neutral connection to the wall switch, and line-isolated multi-inputs (LIMI), such as LIMI-1 and/or LIMI-2 to the TLED lamp. According to one aspect, if multiple lights or LEDs are connected in the manner as shown in FIG. 1, then each light may be implemented identically. For example, the four different lights may be controlled by identically over the same two wires. Additionally, although digital control is described herein, other techniques of digital control are contemplated, such as color changing, for example.

Two unpowered leads available in a single ended powered LED retrofit tube may be utilized to input a variety of control signals. For general control, the LED tube's powered leads may, in addition, incorporate a response to conventional phase cut dimming angle, conventional power line communications, or a custom power line control. The LED tube may also be equipped with an RF transceiver for Bluetooth or Wi-Fi control. The control signal may either be analog (e.g., 0-10V) or digital addressable lighting interface (DALI). An analog signal typically encodes a single function (e.g., dimming or other control) while a digital signal it may encode a variety of commands to the load (e.g., dimming, color control, zone, emergency flashing, etc.). In this regard, the control circuit 210 may take advantage of the 'open' pins for lamp control purposes, such as to provide a 0-10V control input.

Again, the control circuit 210 may utilize the "unused" TLED power pins in a retrofit installation to provide control compatibility for the analog and digital control signals. The control circuit 210 may be suited for using existing controls in retrofit applications.

TLED retrofit lamps generally have four power input pins which provide mechanical compatibility to for fluorescent tubes or older TLED tubes to be replaced. Typically, merely two pins are utilized to provide power to the TLED lamp. TLED lamps wired as "single ended power" retrofits, for example, have two power pins (i.e., switch line and neutral) and two electrically 'open' pins.

The two pins may be utilized for other common control signals, for example, DALI, or 3-Wire phase control. However, merely two wires may be available for control. Control signals, however, may be different both in voltage levels and in timing. In the 0-10V type system, for example, the control may be a passive variable resistance with the 0-10 DC volts generated by the smart lamp; in the 3 wire phase control, the voltage may be AC at line frequency with peaks as high as positive and negative 400 volts. DALI or digital signals typically may be around 16V. Further, they may be wired in either direction so the input circuit should ideally work for either polarity.

It may thus be desirable to have a "smart" TLED lamp that operates with a variety of control means while using only two input leads. The control circuit 210 described herein enables such operation. The microcontroller 110 and lamp control circuitry built in to the "smart" TLED may interpret the control signals accordingly. The control circuit 210 may provide an interface to achieve signal compatibility in this regard.

Figure 2:
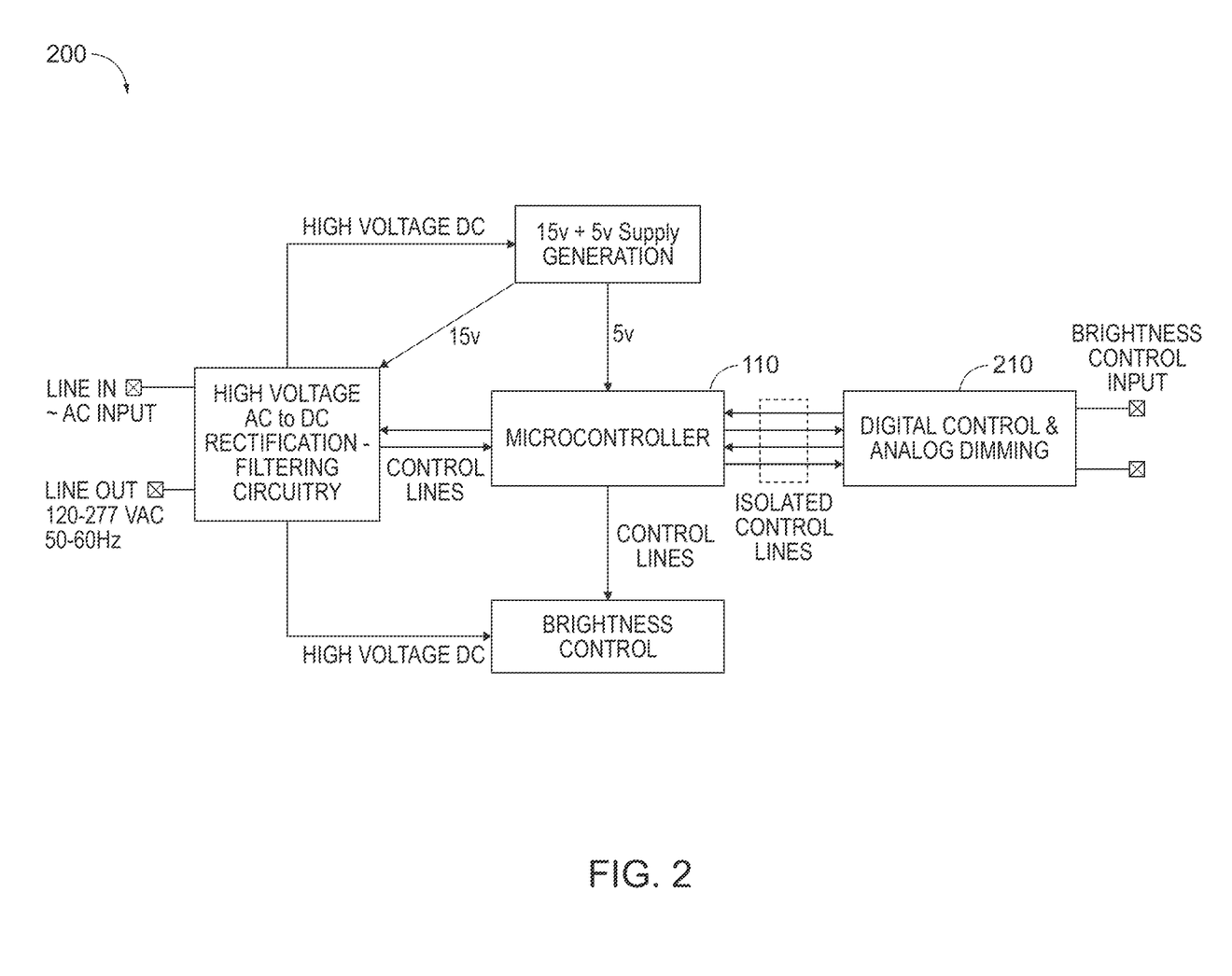
FIG. 2 is an exemplary block diagram of a control circuit for a tubular light emitting diode (TLED) lamp, according to one aspect.

FIG. 2 is an exemplary block diagram of the control circuit 210 for the TLED lamp, according to one aspect. As seen in FIG. 2, the microcontroller 110 may be implemented in conjunction and be electrically connected and/or driven by the control circuit 210 which may provide digital dimming, analog dimming, digital control, analog control, triac dimming, triac control, etc. The electrical connection between the microcontroller 110 and the control circuit 210 may be electrically isolated via isolated control signal lines, depicted in the dashed box in FIG. 2. The electrical isolation (e.g., between the control circuit 210 and the microcontroller 110) may be achieved via an optocoupler and/or a transformer, for example. However, any other means of electrical isolation may be implemented. The isolation may be handled by a transformer for analog signals and optocouplers for digital signals. Control signals may activate an LED and a photo-receptor may picks up the signal on the controller end. The microcontroller 110 may be electrically connected to a power supply, a brightness controller, and/or other circuitry, such as filtering circuitry or rectification circuitry.

Figure 3:
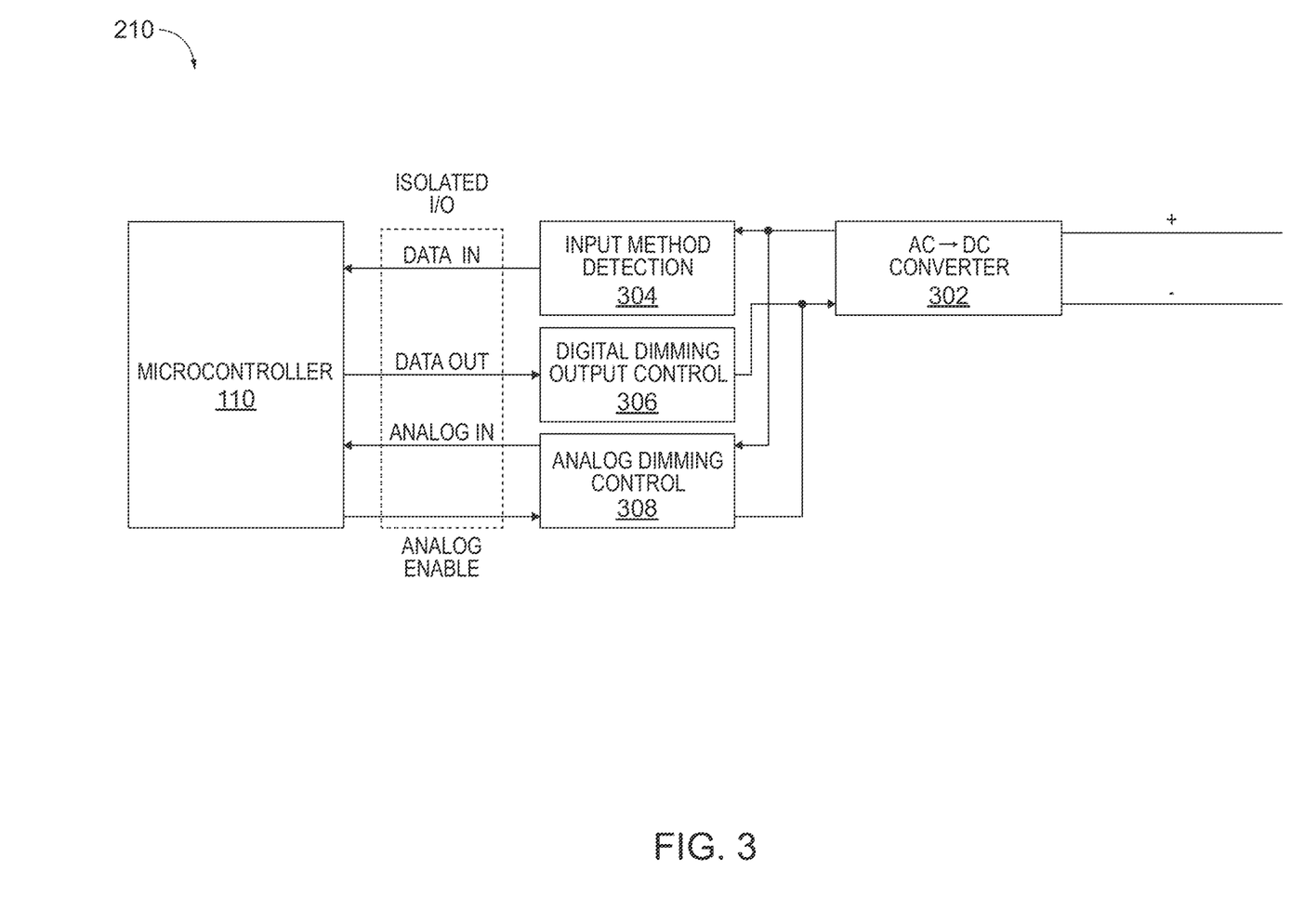
FIG. 3 is an exemplary block diagram of a control circuit for a tubular light emitting diode (TLED) lamp, according to one aspect.

FIG. 3 is an exemplary block diagram of the control circuit 210 for the TLED lamp, according to one aspect. The control circuit 210 may include a voltage protection circuit 302, an input detection circuit 304, a digital control circuit 306, and an analog control circuit 308. The voltage protection circuit 302 may be configured to pass the input signal (e.g., (+) in FIG. 3) to the input detection circuit 304. The voltage protection circuit 302 may include an AC to DC converter. The input detection circuit 304, the digital control circuit 306, and the analog control circuit 308 may communicate one or more electrical signals to and/or from the microcontroller 110. According to one aspect, the control circuit 210 may include the microcontroller 110.

The input detection circuit 304 may be configured to detect, from an input signal (e.g., via an input signal line from the voltage protection circuit 302), a type of control desired based on a characteristic of the input signal and generate an output signal, which may be a data in signal via a data in signal line to the microcontroller 110. In this way, the microcontroller 110 may be configured to receive the output signal from the input detection circuit 304. The microcontroller 110 may obtain power from an actual, intended line in, line out/neutral connection. This actual, intended line in, line out/neutral connection is different from the fixture line in, neutral/line out connection associated with the voltage protection circuit 302. In this regard, line in, neutral/line out connections described herein refer to the line in, fixture neutral/line out connections.

According to one aspect, the input detection circuit 304 may detect triac control as the type of control desired based on a triac component from the input signal including a delay. In other words, the triac control characteristic is that line voltage is temporarily cut off to be 0V. The duration of the cut off may correspond to a percentage of the full output. For example, if the cut off for the voltage is 10 percent, then the output may be 90 percent maximum brightness. The input detection circuit 304 may detect digital control as the type of control desired based on a digital component from the input signal including a square waveform or other similar waveform. The input detection circuit 304 may detect analog control as the type of control desired based on an analog component from the input signal.

The digital control circuit 306 may be configured to control operation according to a digital lighting protocol. The digital control circuit 306 may be enabled or disabled based on the output signal or data out signal via a data out signal line from the microcontroller 110 or the input detection circuit 304.

The analog control circuit 308 may be configured to control operation according to a voltage associated with the input signal, passed along an analog in signal line to the microcontroller 110. The analog control circuit 308 may be enabled or disabled based on the output signal from the input detection circuit 304 in this way.

According to one aspect, the microcontroller 110 may perform a series of checks for the different types of control. For example, the microcontroller 110 may check for the type of control desired by analyzing the characteristic of the input signal first for a line voltage, second for triac control, third for digital control, and fourth for analog control. This may be because the analog control circuit 308 may implement its own voltage protection circuit 302 as analog may be the last scenario checked by the microcontroller 110. In this regard, the microcontroller 110 may ensure there is no high voltage present. When no high voltage is detected by the microcontroller 110, the voltage protection circuit 302 may disable protection associated with the analog control circuit 308.

In this way, the control circuit 210 for the TLED lamp described herein may provide many advantages. For example, the control circuit 210 may provide 'control' via multiple wired dimming and color tuning capabilities, provide simple control retrofit option for systems with controls wires already in place, provides affordable and accessible dimmable and circadian-ready capabilities for existing buildings with existing wired controls, enable dimming and color tuning while maintaining high power factor and low total harmonic distortion (THD), utilize existing control wiring and control systems, operate in buildings with either 2-wire or 3-wire electrical systems and be universal voltage compatible from 120V to 277V, thereby mitigating any need to retrofit. Additionally, installation is simple, such as by attaching existing control wires to an unwired TLED socket.

Further, unlike other lighting controls that utilize wireless communication protocols, a wired system is "network safe", free from increasingly common cybersecurity hacks and risks. The wired control system preserves the integrity of the power line. Unlike power line phase dimming, for example, the power line may operate as a sinusoidal source and LED Tube load. The power system may exhibit both high power factor and low THD, thereby making it ideal for commercial buildings, schools, and hospitals. Thus, the control circuit 210 may be used as a lighting control input for smart TLED lamps (e.g., to provide dimming as a dimmer circuit or color tuning). This approach is compatible with the operation (but, otherwise, not necessarily the control) of conventional single ended powered LED lamps on the same power circuit.

FIGS. 3-9 are now described according to the voltage protection circuit 302, the input detection circuit, 304, the digital control circuit 306, the analog control circuit 308, and the microcontroller under a variety of operating conditions, such as a backwards light, a triac control mode, a digital control mode, an analog control mode, etc.

Figure 4:
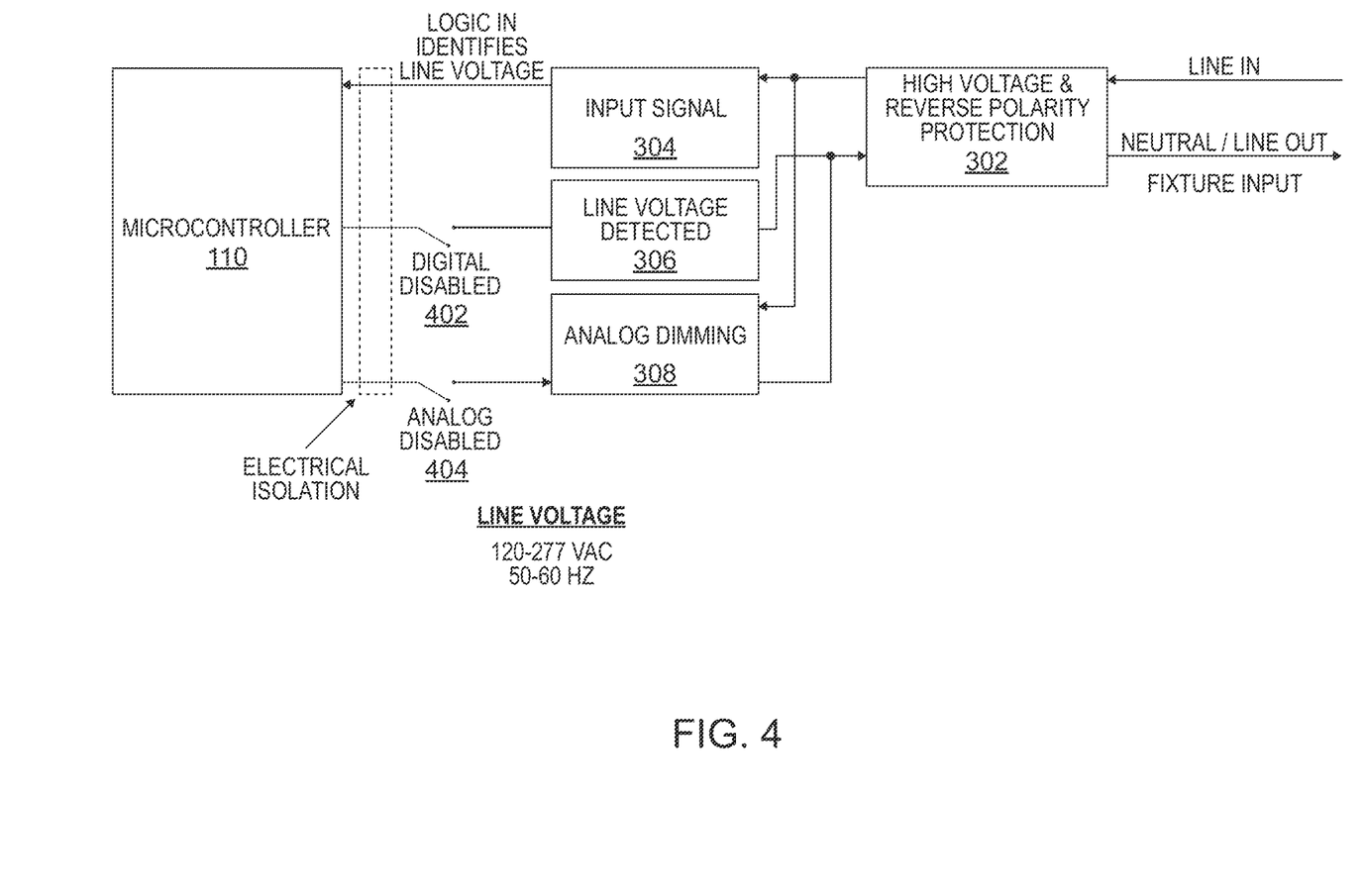
FIG. 4 is an exemplary block diagram of a control circuit for a tubular light emitting diode (TLED) lamp, according to one aspect.

As seen in FIGS. 3-4, the inputs and outputs (I/O) to and from the microcontroller 110 may be electrically isolated from the other end of the light. FIG. 4 is an exemplary block diagram of the control circuit 210 for the TLED lamp, according to one aspect. In some scenarios, a light may be inserted in backwards. In this scenario there is only one connection of the input power, but it is in backwards. While this may be undesirable for the light to be inserted backwards, the microcontroller 110 does not have power. The line in, the voltage protection circuit 302, the input signal, and the input detection circuit 304, are operational because they do not require the microcontroller 110 support to operate. Because the microcontroller 110 is unpowered, the digital enable and the analog enable signal lines are disabled or open, and thus the light will not turn on in line voltage scenario. Assuming that the microcontroller 110 somehow has power, the digital enable 402 and the analog enable 404 signal lines are disabled, so no damage may occur to the control circuit 210, effectively disabling the digital control circuit 306 and the analog control circuit 308.

Figure 5:
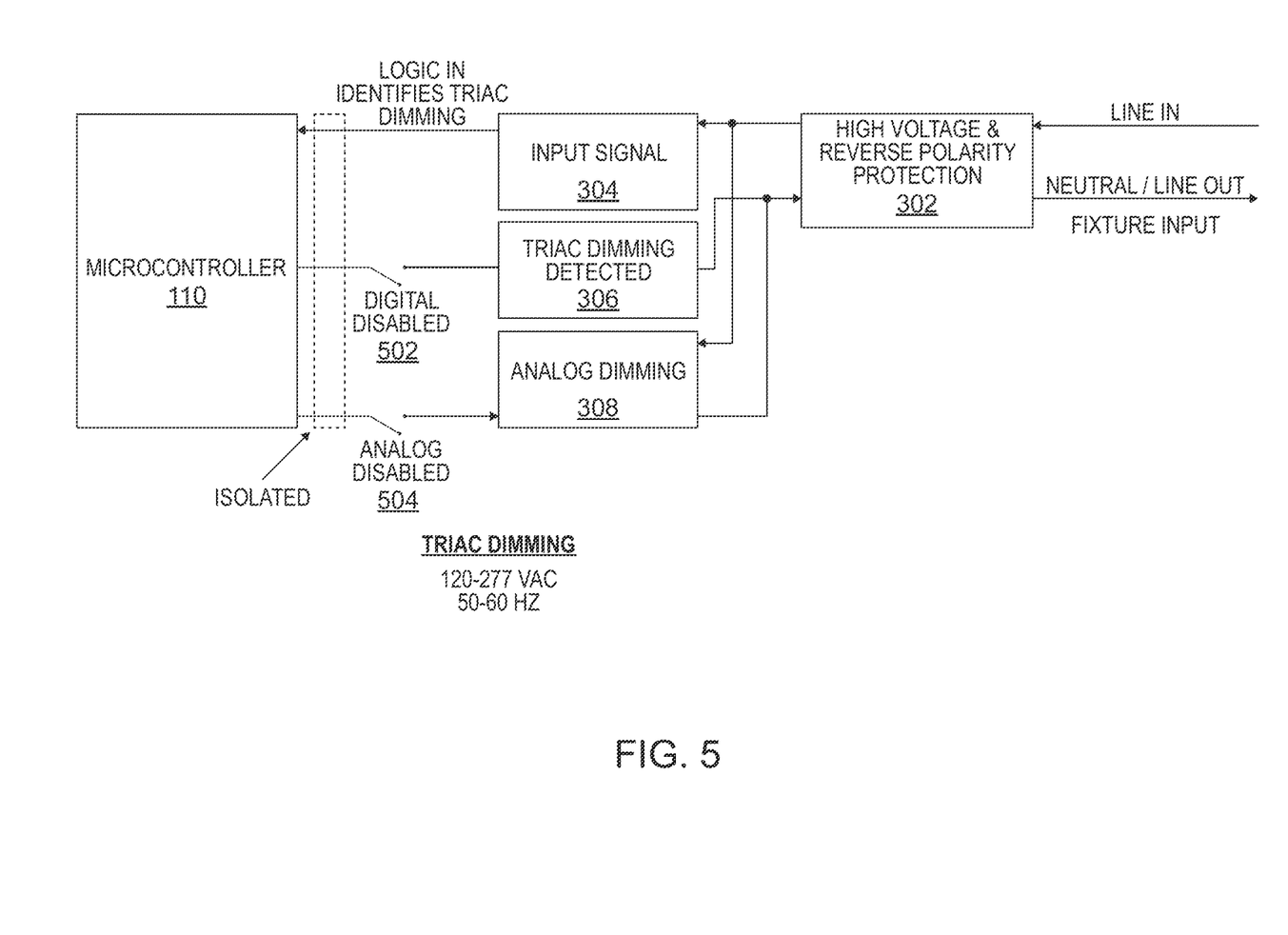
FIG. 5 is an exemplary block diagram of a control circuit for a tubular light emitting diode (TLED) lamp, according to one aspect.

FIG. 5 is an exemplary block diagram of the control circuit 210 for the TLED lamp, according to one aspect. With triac control, the line voltage may be a standard line voltage or a predefined line voltage, during triac control. Here, the microcontroller 110 may be powered up, and the input process may include detecting the line voltage using the input detection circuit 304. When the input detection circuit 304 determines that there is a triac component to the input signal, meaning that it is being turned off momentarily, such as for a few milliseconds, the microcontroller 110 enables triac control mode as the line in or input signal may be passed through the input detection circuit 304 to the microcontroller 110. The delay associated with the triac control may be provided over the input signal line, which may run through the input detection circuit 304 and the voltage protection circuit 302 to the microcontroller 110. Regardless, whether held high or held low, the line in may indicate a desired brightness level. In this scenario, the digital enable 502 and the analog enable 504 signal lines are also disabled or open, effectively disabling the digital control circuit 306 and the analog control circuit 308.

Figure 6:
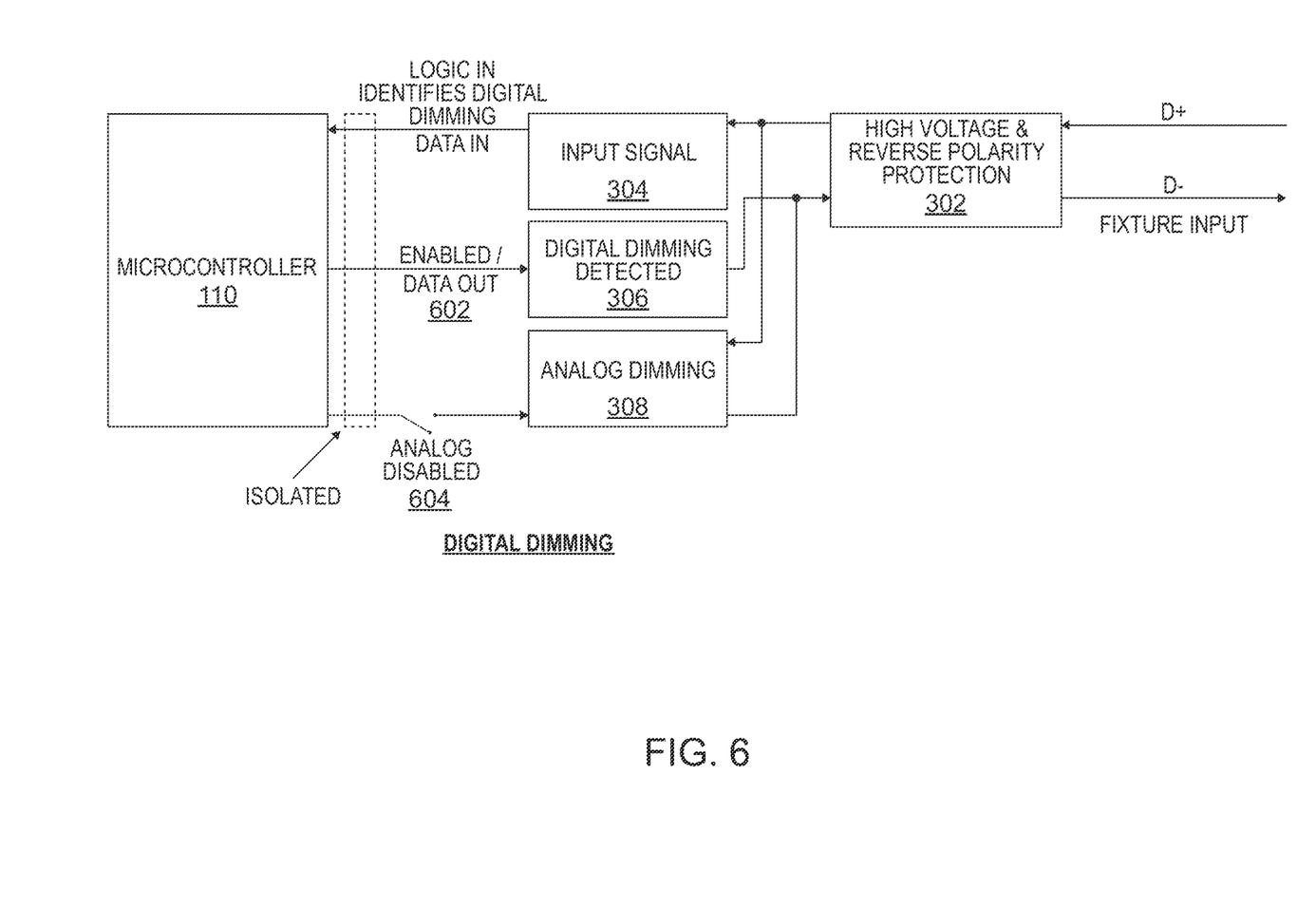
FIG. 6 is an exemplary block diagram of a control circuit for a tubular light emitting diode (TLED) lamp, according to one aspect.

FIG. 6 is an exemplary block diagram of the control circuit 210 for the TLED lamp, according to one aspect. In this scenario, there is a voltage, (i.e., D+ and D−). The voltage protection circuit 302 provides reverse polarity protection in the event that D+ and D− are reversed. In the event that D+ and D− are flipped, the voltage protection circuit 302, is an open circuit and shut everything off, thereby preventing the reverse polarity from being applied to any of the input detection circuit 304, the digital control circuit 306, the analog control circuit 308, and the microcontroller 110.

Referring to the input signal, (D+) comes in, passes through the voltage protection circuit 302, and passes into the input detection circuit 304 and the input detection circuit 304 determines that the input signal indicates desired digital control. This information may be relayed to the microcontroller 110, and the microcontroller 110 may acknowledge the digital control component, and enable the digital control circuit 306. The input detection circuit 304 may pass the digital signal (D+) to the digital control circuit 306 (passing through the voltage protection circuit 302, the input detection circuit 304, and the microcontroller 110) and the digital enabled line 602 is an active data output signal line while the analog enable 504 signal line is disabled or open, effectively disabling the analog control circuit 308.

Figure 7:
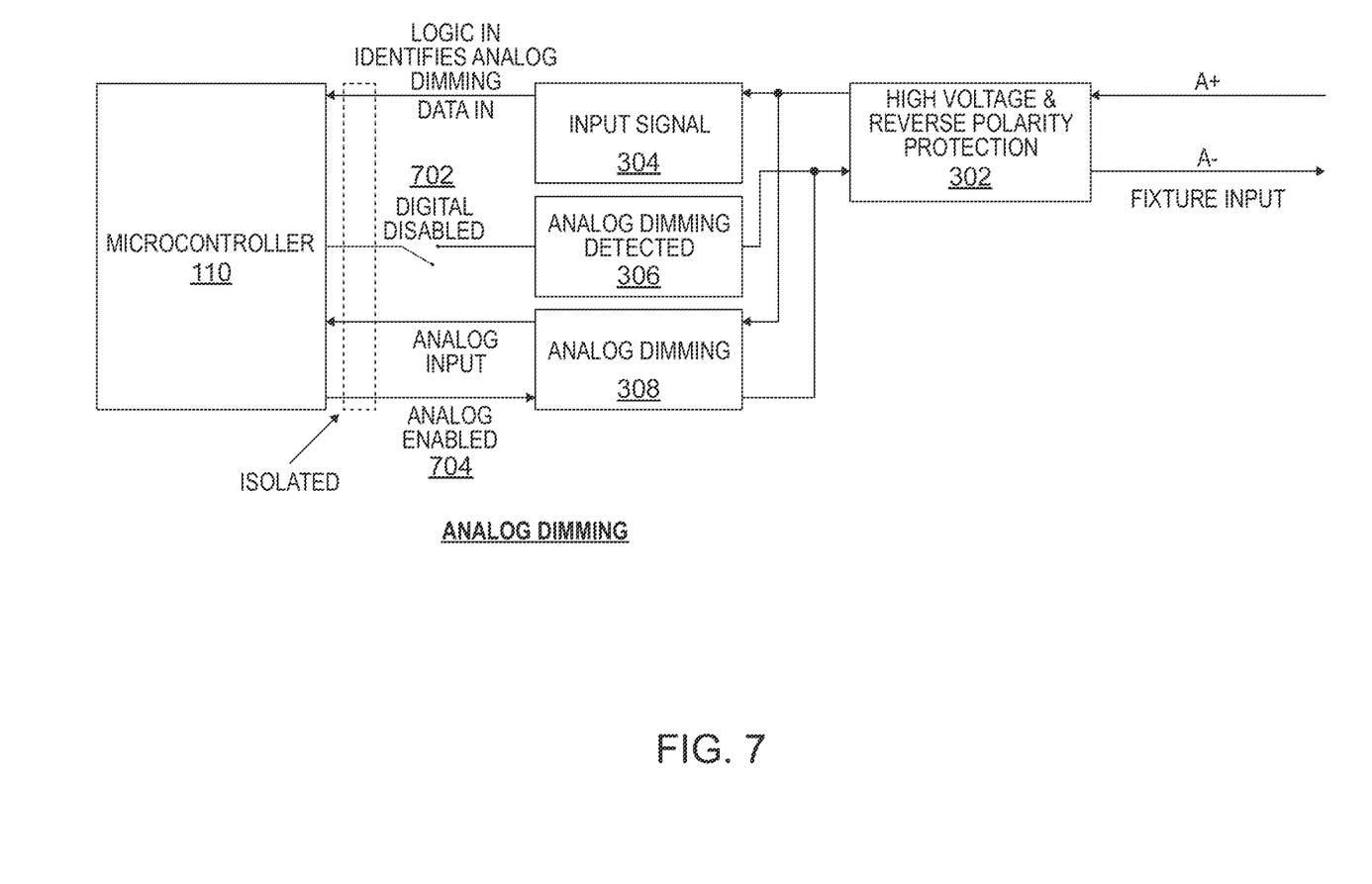
FIG. 7 is an exemplary block diagram of a control circuit for a tubular light emitting diode (TLED) lamp, according to one aspect.

FIG. 7 is an exemplary block diagram of the control circuit 210 for the TLED lamp, according to one aspect. In this scenario, there is an analog voltage as the line in or input signal (A+). A characteristic of the analog voltage is that the analog voltage may stay steady. In this regard, the input detection circuit 304 may not detect a threshold amount of change. Further, the analog voltage may be below a threshold voltage. In this regard, the input detection circuit 304 may set the mode to an analog control mode. The microcontroller 110 may disable the digital disabled line 702 to be open and close the analog enable switch 704, thereby enabling the voltage of the input signal (A+) to directly drive the analog control circuit 308 after passing through the passing through the voltage protection circuit 302, the input detection circuit 304, and the microcontroller 110.

Figure 8:
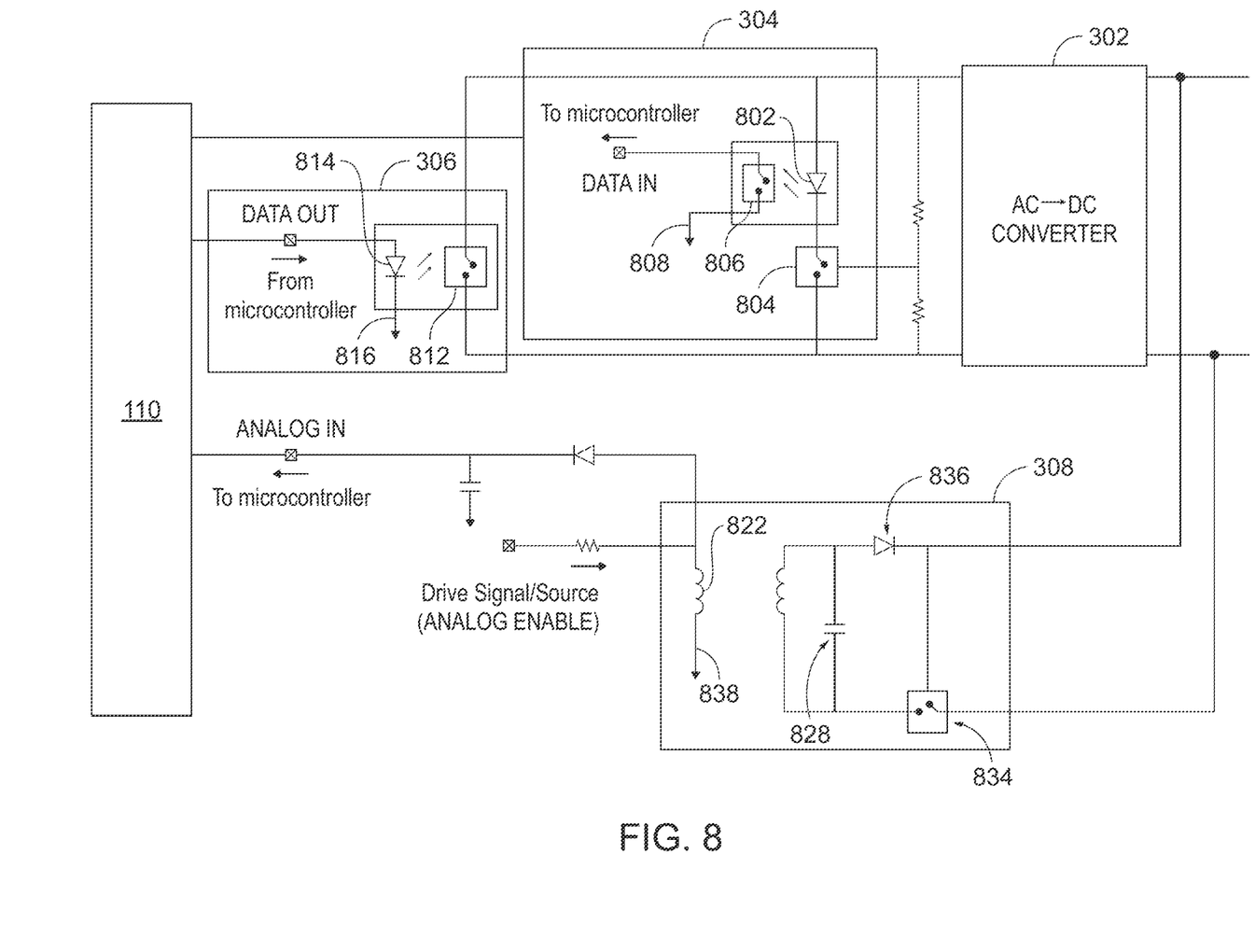
FIG. 8 is an exemplary circuit diagram of a control circuit for a tubular light emitting diode (TLED) lamp, according to one aspect.

FIG. 8 is an exemplary circuit diagram of the control circuit 210 for the TLED lamp, according to one aspect. As discussed, the voltage protection circuit 302 may include or may be the AC to DC converter.

Figure 9:
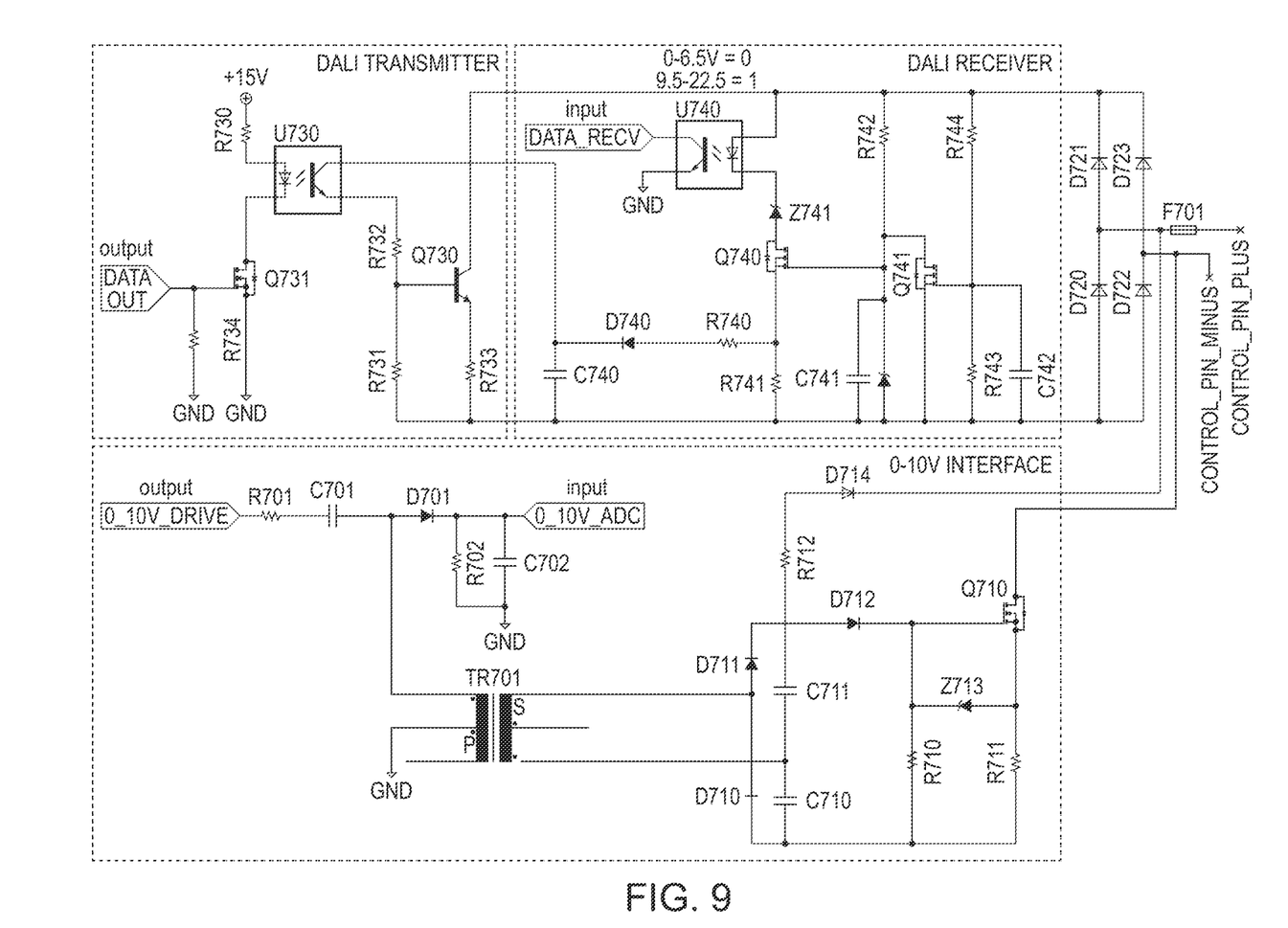
FIG. 9 is an exemplary circuit diagram of a control circuit for a tubular light emitting diode (TLED) lamp, according to one aspect.

The input detection circuit 304 may include a light emitting diode (LED) 802 having an anode end and a cathode end, a first switch 804, and a second switch 806. The cathode end of the LED 802 may be connected to the first switch 804, the anode end of the LED 802 may be connected to an input signal line from the voltage protection circuit 302, and the first switch 804 may switch between a voltage-out of a voltage divider and an end of the voltage divider connected to the voltage protection circuit 302. The second switch 806 may be connected to the data in signal line from the microcontroller 110 and ground 808. The LED 802 and the second switch 806 act as an optocoupler and are drawn to illustrate the electrical isolation discussed herein. With reference to FIG. 9, the first switch 804 may represent a combination of both Q740 and Q741, and is a voltage divider that controls Q741 that controls Q740 that determines DATA_RECV. The voltage divider determined DATA_RECV as seen with the input detection circuit 304.

The digital control circuit 306 may include a switch 812 and an LED 814 having an anode end and a cathode end. The switch 812 may be connected to the input signal through the input detection circuit 304 and the output signal to the voltage protection circuit 302 and the end of the voltage divider connected to the voltage protection circuit 302. The LED 814 may be connected to the data out signal line from the microcontroller 110 and ground 816.

According to one aspect, with reference to FIG. 9, the switch 812 and the LED 814 represent U730 (also an optocoupler), showing the electrical isolation.

The analog control circuit 308 may include a transformer having a first set of windings 822 and a second set of windings. The first set of windings 822 may be connected to an analog enable signal line from the microcontroller 110 and ground 838. Although numbered separately, 808, 816, and 838 are the same ground reference. A first end of the second set of windings may be connected to an input signal line providing the input signal via diode 836. A second end of the second set of windings may be connected to a switch 834 which may be connected to a line out signal line for the control circuit 210. Capacitor 828 may be positioned between a first end of the second set of windings and diode 836 and a second end of the second set of windings and switch 834.

On the analog side, there is the drive source. The first set of windings 822 may be a component that uses magnetic coupling, which means there is going to be an AC signal. According to FIG. 8, a voltage between diode 836 and a line out controls the switch 834. Hence, the drive source is the analog enable. The diode 836 offers high voltage protection while the switch 834 operates as a disconnect.

The second set of windings and capacitor 828 act as a tank or resonance circuit. Since the source power may be small, this resonance circuit may be useful. The capacitor 828 may have the voltages across its terminals constantly alternating. This is assisted with diode 836, as well as the induced AC voltage coming from the first set of windings 822.

FIG. 9 is an exemplary circuit diagram of the control circuit 210 for the TLED lamp, according to one aspect. D720-D723 may be compassed as voltage protection circuit 302 (AC->DC converter).

The following logic table may be implemented for the input detection circuit 304:

| Input Voltage (AC or DC) | Q741 Status | Q740 Status | DATA_RECV (read by microcontroller, 110) |
| --- | --- | --- | --- |
| 0-6.5 | OFF | OFF | Logic 0 (0 V) |
| 9.5-22.5 | OFF | ON | Logic 1 (5 V) |
| >22.5 | ON | OFF | Logic 0 (0 V) |

The unaccounted gap between 6.5 and 9.5 may be hysteresis.

This is how the input detection works. If the signal is line voltage, the microcontroller may detect a 120 Hz (i.e., AC rectified) repeating pulse every time the voltage rises and lowers into that range. For triac, the microcontroller may detect 60 Hz. For digital, the pulse may be much faster than 120 Hz. DALI may be 1200 baud, which is 1.2 kHz. Lastly, for analog, the pulse may not exist or may rest at logic 1.

For the digital output, when not receiving data, CONTROL_PIN_PLUS may be held high (e.g., 22.5 V). To respond back to a message, DATA_OUT may be toggled. There are 3 switches involved with this, Q731, U730, and Q730. The following logic table may be implemented for the digital control circuit 306:

| DATA_OUT | Q731 | U730 | Q730 | Digital Signal (read by the receiver) |
| --- | --- | --- | --- | --- |
| 0 V | OFF | OFF | OFF | Logic 1 |
| 5 V | ON | ON | ON | Logic 0 |

The data inversion is because when Q730 is ON, this shorts CONTROL_PIN_PLUS to CONTROL_PIN_MINUS through R733, which is the intended design for DALI, but could work for anything properly designed for that behavior.

With respect to analog, the square wave 0_10V_DRIVE signal creates an AC source across C701. The AC source induces a voltage across TR701, creating an AC voltage on the S side of TR701. The voltage on the S side of TR701 may be sufficient to turn ON Q710 (Q710 remains on indefinitely). With Q710 ON, this removes the open circuit, allowing the circuit to be loaded down. The circuit may be loaded down from the resistance between CONTROL_PIN+/−(this resistance would be part of the light switch or other control and is not shown). With the circuit loaded down, this causes measurable changes in voltage on the P side of TR701. The voltage changes on the P side of TR701 may be filtered through R702 and C702. 0_10V_ADC may be the filtered voltage, which may be sampled or measured by the microcontroller (110).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A control circuit for a tubular light emitting diode (TLED) lamp, comprising:
   an input detection circuit configured to detect, from an input signal, a type of control desired based on a characteristic of the input signal and generate an output signal, wherein the type of control is analyzed first for a line voltage, second for triac control, third for digital control, and fourth for analog control;
   a digital control circuit configured to control operation according to a digital lighting protocol, wherein the digital control circuit is enabled or disabled based on the output signal; and
   an analog control circuit configured to control operation according to a voltage associated with the input signal, wherein the analog control circuit is enabled or disabled based on the output signal.

2. The control circuit for the TLED lamp of claim 1, comprising a microcontroller configured to receive the output signal from the input detection circuit.

3. The control circuit for the TLED lamp of claim 1, wherein the input detection circuit detects triac control as the type of control desired based on a triac component from the input signal including a delay.

4. The control circuit for the TLED lamp of claim 1, wherein the input detection circuit detects digital control as the type of control desired based on a digital component from the input signal including a square waveform.

5. The control circuit for the TLED lamp of claim 1, wherein the input detection circuit detects analog control as the type of control desired based on an analog component from the input signal.

6. The control circuit for the TLED lamp of claim 1, comprising a voltage protection circuit configured to pass the input signal to the input detection circuit.

7. The control circuit for the TLED lamp of claim 6, wherein the voltage protection circuit includes an AC to DC converter.

8. The control circuit for the TLED lamp of claim 1, wherein the input detection circuit includes a light emitting diode (LED) having an anode end and a cathode end, a first switch, and a second switch, wherein the cathode end of the diode is connected to the first switch, wherein the anode end of the diode is connected to an input signal line from a voltage protection circuit, and wherein the first switch switches between a voltage- out of a voltage divider and an end of the voltage divider connected to the voltage protection circuit.

9. The control circuit for the TLED lamp of claim 1, wherein the digital control circuit includes a switch and a light emitting diode (LED) having an anode end and a cathode end, wherein the switch is connected to the input signal through the input detection circuit and the output signal to a voltage protection circuit.

10. The control circuit for the TLED lamp of claim 1, wherein the analog control circuit includes a transformer having a first set of windings and a second set of windings, wherein the first set of windings is connected to an analog enable signal line from a microcontroller, wherein a first end of the second set of windings is connected to an input signal line providing the input signal, and wherein a second end of the second set of windings is connected to a switch which is connected to a line out signal line for the control circuit.

11. A control circuit for a tubular light emitting diode (TLED) lamp, comprising:
   an input detection circuit configured to detect, from an input signal, a type of control' desired based on a characteristic of the input signal and generate an output signal, wherein the type of control is analyzed first for a line voltage, second for triac control, third for digital' control, and fourth for analog control;
   a digital control circuit configured to control operation according to a digital lighting protocol, wherein the digital control circuit is enabled or disabled based on the output signal;
   an analog control circuit configured to control operation according to a voltage associated with the input signal, wherein the analog control circuit is enabled or disabled based on the output signal; and
   a voltage protection circuit configured to pass the input signal to the input detection circuit.

12. The control circuit for the TLED lamp of claim 11, comprising a microcontroller configured to receive the output signal from the input detection circuit.

13. The control circuit for the TLED lamp of claim 11, wherein the input detection circuit detects triac control as the type of control desired based on a triac component from the input signal including a delay.

14. The control circuit for the TLED lamp of claim 11, wherein the input detection circuit detects digital control as the type of control desired based on a digital component from the input signal including a square waveform.

15. The control circuit for the TLED lamp of claim 11, wherein the input detection circuit detects analog control as the type of control desired based on an analog component from the input signal.

16. The control circuit for the TLED lamp of claim 11, wherein the voltage protection circuit includes an AC to DC converter.

17. A control circuit fora tubular light emitting diode (TLED) lamp, comprising:
   an input detection circuit configured to detect, from an input signal, a type of control' desired based on a characteristic of the input signal and generate an output signal, wherein the type of control is analyzed first for a line voltage, second for triac control, third for digita control, and fourth for analog control;
   a digital control circuit configured to control operation according to a digital lighting protocol, wherein the digital control circuit is enabled or disabled based on the output signal;
   all analog control circuit configured to control operation according to a voltage associated with the input signal, wherein the analog control circuit is enabled or disabled based on the output signal; and
   a microcontroller configured to receive the output signal from the input detection circuit.

18. The control circuit for the TLED lamp of claim 17, wherein the input detection circuit detects triac control as the type of control desired based on a triac component from the input signal including a delay.

19. The control circuit for the TLED lamp of claim 17, wherein the input detection circuit detects digital control as the type of control desired based on a digital component from the input signal including a square waveform.

20. The control circuit for the TLED lamp of claim 17, wherein the input detection circuit detects analog control as the type of control desired based on an analog component from the input signal.

\* \* \* \* \*